(12) United States Patent
Hyuga

(10) Patent No.: US 10,931,867 B2
(45) Date of Patent: Feb. 23, 2021

(54) IMAGE PROCESSING APPARATUS, ROBOT AND ROBOT SYSTEM

(71) Applicant: Seiko Epson Corporation, Tokyo (JP)

(72) Inventor: Takashi Hyuga, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/417,697

(22) Filed: May 21, 2019

(65) Prior Publication Data
US 2019/0364193 A1 Nov. 28, 2019

(30) Foreign Application Priority Data

May 22, 2018 (JP) ................................ 2018-097490

(51) Int. Cl.
*G06T 7/00* (2017.01)
*H04N 5/232* (2006.01)

(52) U.S. Cl.
CPC ....... *H04N 5/23216* (2013.01); *G06T 7/0004* (2013.01); *H04N 5/23222* (2013.01); *G06T 2207/30164* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 6,882,750 | B2 * | 4/2005 | Suzuki | H03M 7/40 375/E7.144 |
| 9,189,193 | B2 * | 11/2015 | Kim | H04N 1/00453 |
| 10,181,203 | B2 * | 1/2019 | Lee | G06T 9/00 |
| 2019/0130202 | A1 * | 5/2019 | Doumbouya | G06K 9/3241 |
| 2019/0285406 | A1 * | 9/2019 | Hazeyama | G01N 21/95684 |
| 2020/0050255 | A1 * | 2/2020 | Lee | G06F 3/005 |

FOREIGN PATENT DOCUMENTS

| | | |
|---|---|---|
| JP | 2004-012633 A | 1/2004 |
| JP | 2006-108810 A | 4/2006 |

* cited by examiner

*Primary Examiner* — Shadan E Haghani
(74) *Attorney, Agent, or Firm* — Harness, Dickey & Pierce, P.L.C.

(57) ABSTRACT

An image processing apparatus includes a processor, in which the processor receives parameter settings including imaging parameters and image processing parameters, executes a processing sequence including imaging and image processing based on the parameter settings to output a result image, determines whether the result image is acceptable or not based on a predetermined determination condition, causes a display unit to display a plurality of reduced images indicating execution results of the processing sequence of the parameter settings as a plurality of result images in a list manner, and displays a determination result on a display area of the plurality of result images.

18 Claims, 16 Drawing Sheets

FIG. 1
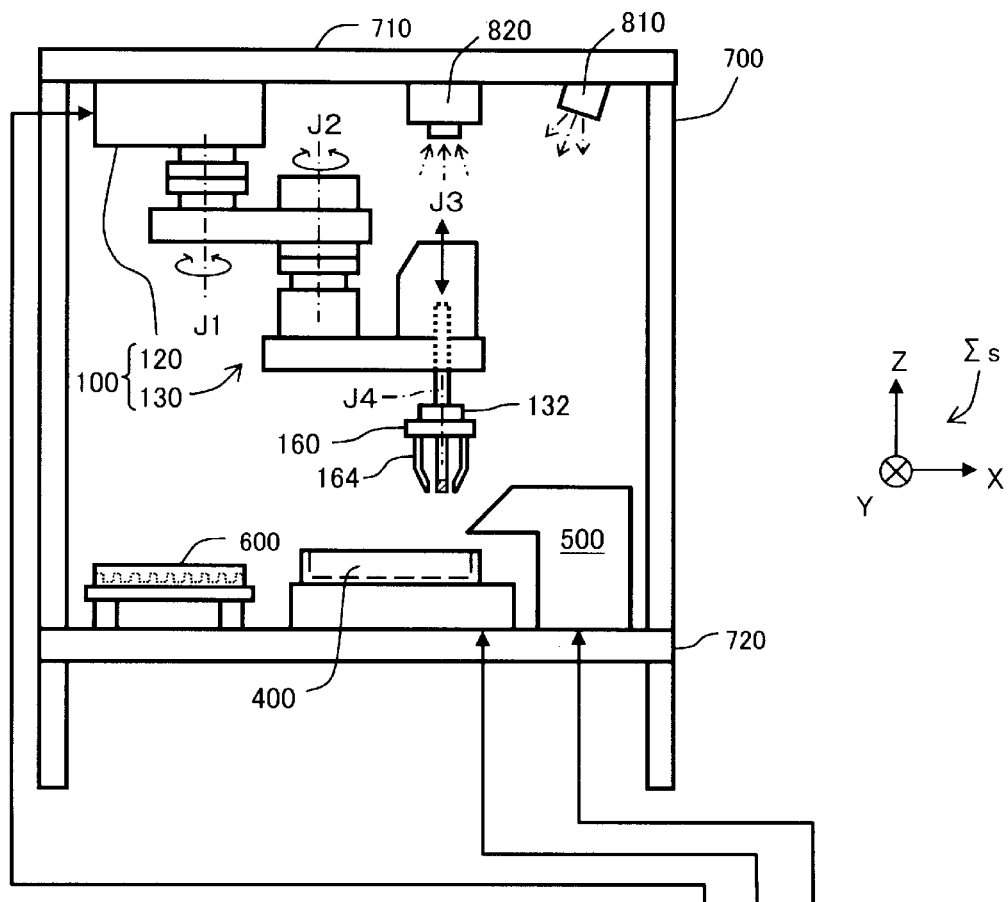
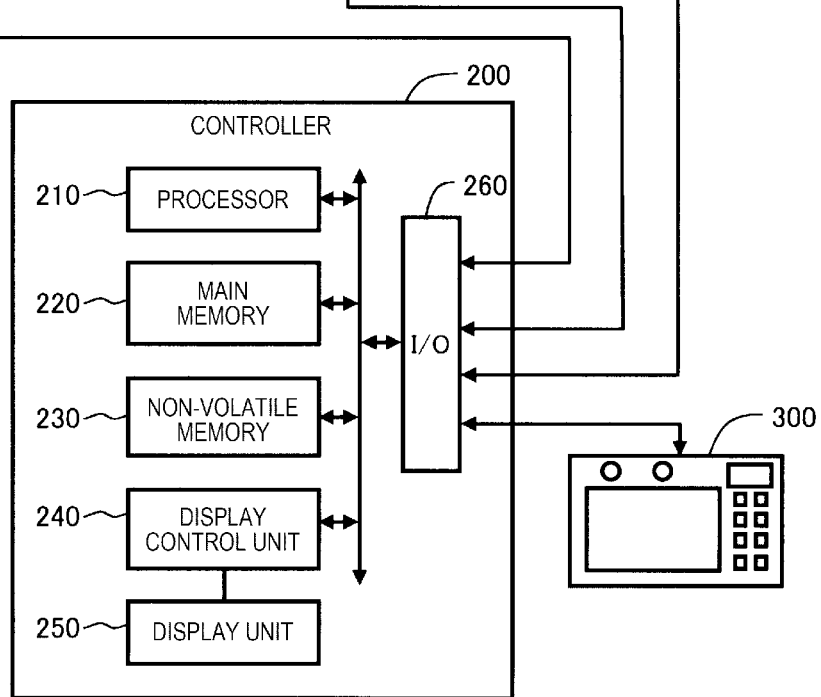

IMAGE PROCESSING APPARATUS, ROBOT AND ROBOT SYSTEM

The present application is based on and claims priority from JP Application Serial Number 2018-097490, filed May 22, 2018, the disclosure of which is hereby incorporated by reference herein in its entirety.

BACKGROUND

1. Technical Field

The present disclosure relates to a technique for performing imaging with a camera and image processing.

2. Related Art

In a variety of devices such as robots, a technique is used, which images a subject with a camera and recognizes the subject by processing the image, such that the robot performs work on the subject. At that time, it is necessary for a user to set preferable image processing conditions for recognizing the subject. JP-A-2006-108810 discloses a technique of receiving selection of a plurality of image corrections for the same image and correction amounts thereof and printing out reduced images resulting from the image correction side by side. Correction items and correction values are displayed on the outer periphery of a display column of the reduced images. In this technique, since the correction items and the correction values are displayed together with the reduced images, it is possible to set the image processing conditions with which it is possible to obtain a preferable image by comparing the correction results of applying a plurality of items.

However, in the related art described above, since the image size of each of the reduced images is small, it is difficult to determine preferable image processing conditions, in some cases.

SUMMARY

According to an aspect of the present disclosure, there is provided an image processing apparatus. The image processing apparatus connected to a display unit includes a parameter receiving unit that receives a plurality of sets of parameter settings including a combination of imaging parameters for imaging a subject and acquiring an image and image processing parameters for performing image processing on the image; a sequence execution unit that executes a processing sequence including the imaging and the image processing based on the plurality of sets of parameter settings to output a result image; a determination unit that determines whether a feature amount included in the result image is acceptable or not based on a predetermined determination condition; and a list display execution unit that causes the display unit to display each of a plurality of reduced images indicating execution results of the processing sequence of the plurality of sets of parameter settings as a plurality of result images in a list manner. The list display execution unit displays a determination result by the determination unit on each display area of the plurality of result images.

BRIEF DESCRIPTION OF THE DRAWINGS

FIG. 1 is a conceptual diagram showing a robot system.

DESCRIPTION OF EXEMPLARY EMBODIMENTS

A. First Embodiment

Figure 2:
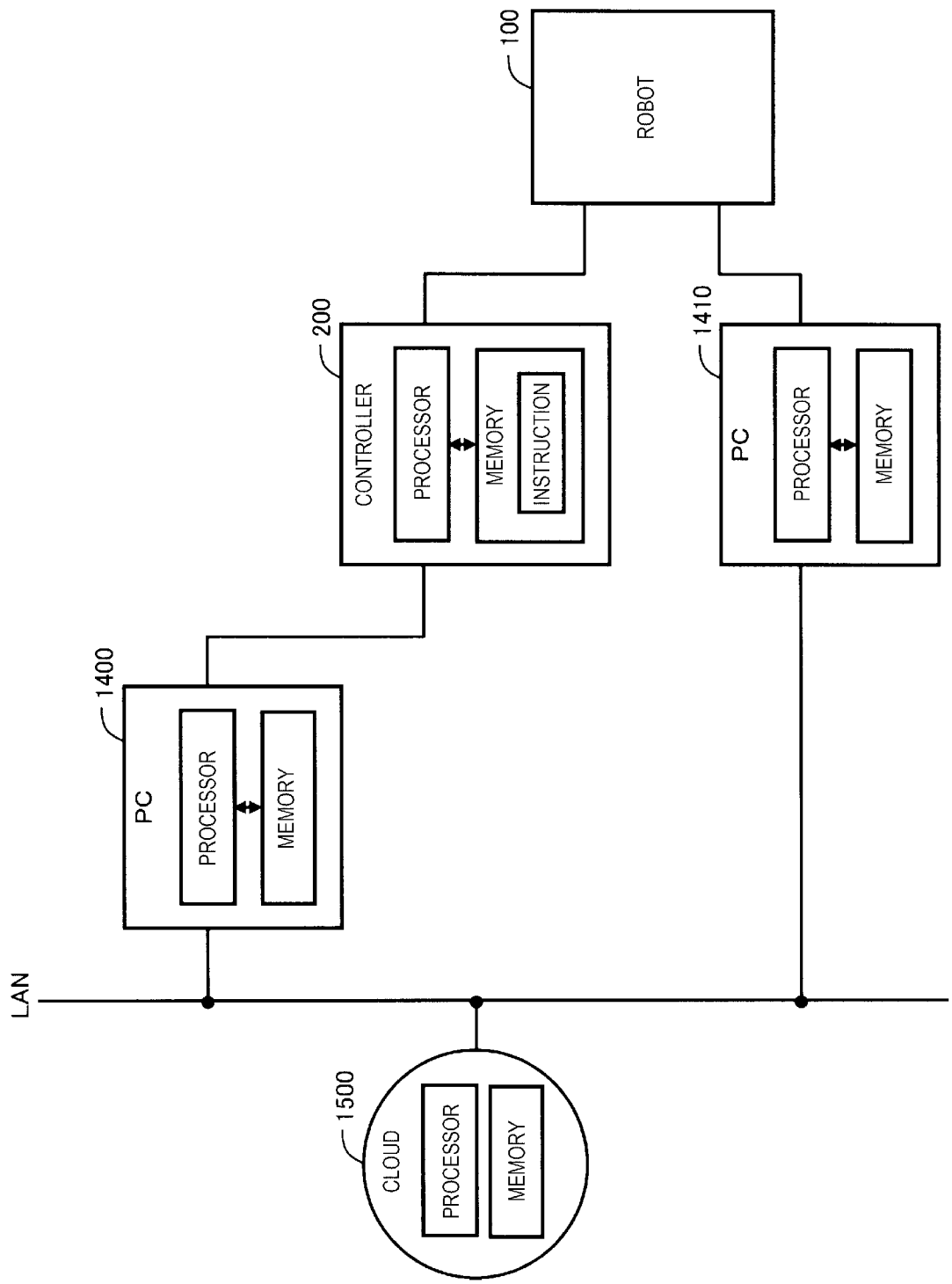
FIG. 2 is a conceptual diagram showing an example of a controller having a plurality of processors.

FIG. 1 is a conceptual diagram showing a robot system. This robot system is installed on a frame 700 and includes a robot 100, a controller 200 connected to the robot 100, a teaching pendant 300, a parts feeder 400, a hopper 500, a parts tray 600, a strobe 810, and a camera 820. The robot 100 is fixed under a top plate 710 of the frame 700. The parts feeder 400, the hopper 500, and the parts tray 600 are placed on a table 720 of the frame 700. The robot 100 is a teaching playback type robot. A work is carried out using the robot 100 in accordance with teaching data created in advance. In this robot system, a coordinate system Es defined by three orthogonal coordinate axes X, Y, Z is set. In the example of FIG. 1, the X axis and the Y axis are in the horizontal direction and the Z axis is in the vertical upward direction. Teaching points included in the teaching data and the posture of the end effector are expressed by the coordinate values of the coordinate system Es and the angle around each axis.

The robot 100 includes a base 120 and an arm 130. The arm 130 is connected in sequence by four joints J1 to J4. Among these joints J1 to J4, three joints J1, J2 and J4 are torsional joints and one joint J3 is a translational joint. In the present embodiment, a 4-axis robot is illustrated, but a robot having any arm mechanism having one or more joints may be used.

An end effector 160 is attached to an arm flange 132 provided at a distal end portion of the arm 130. In the example of FIG. 1, the end effector 160 is a gripper that grips and picks up parts using the gripping mechanism 164. As the end effector 160, it is also possible to attach another mechanism such as an adsorption pickup mechanism.

The parts feeder 400 is an accommodating device for accommodating the parts gripped by the end effector 160. The parts feeder 400 may be configured with a vibrating mechanism for vibrating the parts to disperse the parts. The hopper 500 is a parts supply device that supplies parts to the parts feeder 400. The parts tray 600 is a tray having a large number of recesses for individually accommodating the parts. In the present embodiment, the robot 100 picks up apart from the parts feeder 400 and stores the part in an appropriate position in the parts tray 600. However, the robot system may also be applied to works other than this.

The controller 200 has a processor 210, a main memory 220, a non-volatile memory 230, a display control unit 240, a display unit 250, and an I/O interface 260. These are connected to each other through a bus. The processor 210 is a microprocessor or a processor circuit, for example. The controller 200 is connected to the robot 100, the teaching pendant 300, the parts feeder 400, and the hopper 500 through the I/O interface 260. The controller 200 is also connected to the strobe 810 and the camera 820 through the I/O interface 260. Further, the teaching pendant 300 may be an information processing apparatus such as a personal computer.

As a configuration of the controller 200, it is possible to adopt various configurations other than the configuration shown in FIG. 1. For example, the processor 210 and the main memory 220 may be removed from the controller 200 of FIG. 1, and the processor 210 and the main memory 220 may be provided in another device communicably connected to the controller 200. In this case, the entire device including another device and the controller 200 serves as the controller of the robot 100. In another embodiment, the controller 200 may include two or more processors 210. In yet another embodiment, the controller 200 may be realized by a plurality of devices communicably connected to each other. In these various embodiments, the controller 200 is configured as a device or a group of devices including one or more processors 210.

FIG. 2 is a conceptual diagram showing an example in which a controller of a robot includes a plurality of processors. In this example, in addition to the robot 100 and controller 200 thereof, personal computers 1400 and 1410 and a cloud service 1500 provided through a network environment such as a LAN are illustrated. The personal computers 1400 and 1410 each include a processor and a memory. In the cloud service 1500, a processor and a memory may also be used. It is possible to realize the controller of the robot 100 by using some or all of these plurality of processors.

Figure 3:
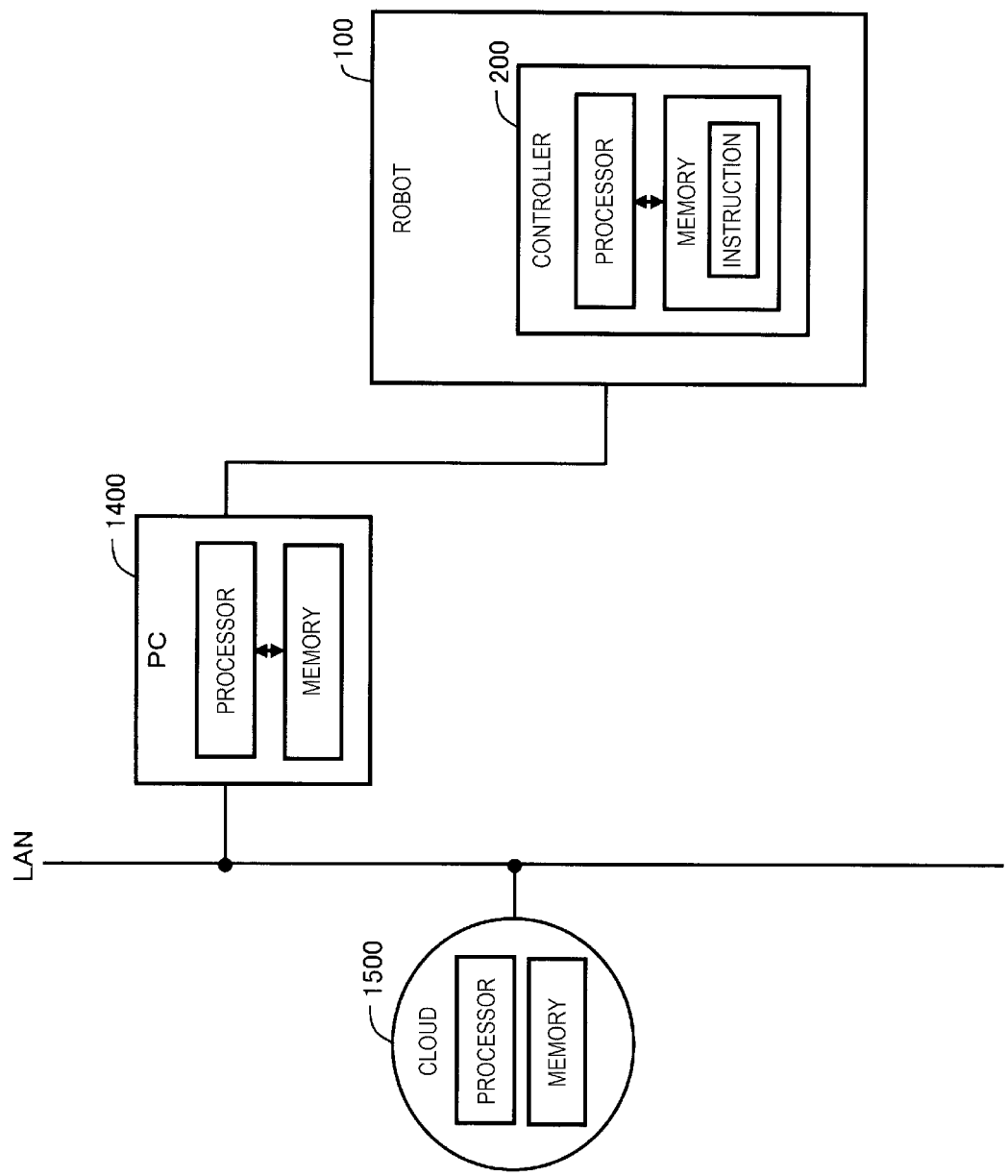
FIG. 3 is a conceptual diagram showing another example of a controller having a plurality of processors.

FIG. 3 is a conceptual diagram showing another example in which a controller of a robot includes a plurality of processors. This example is different from FIG. 2 in that the controller 200 of the robot 100 is provided in the robot 100. Also in this example, it is possible to realize the controller of the robot 100 by using some or all of the plurality of processors.

Figure 4:
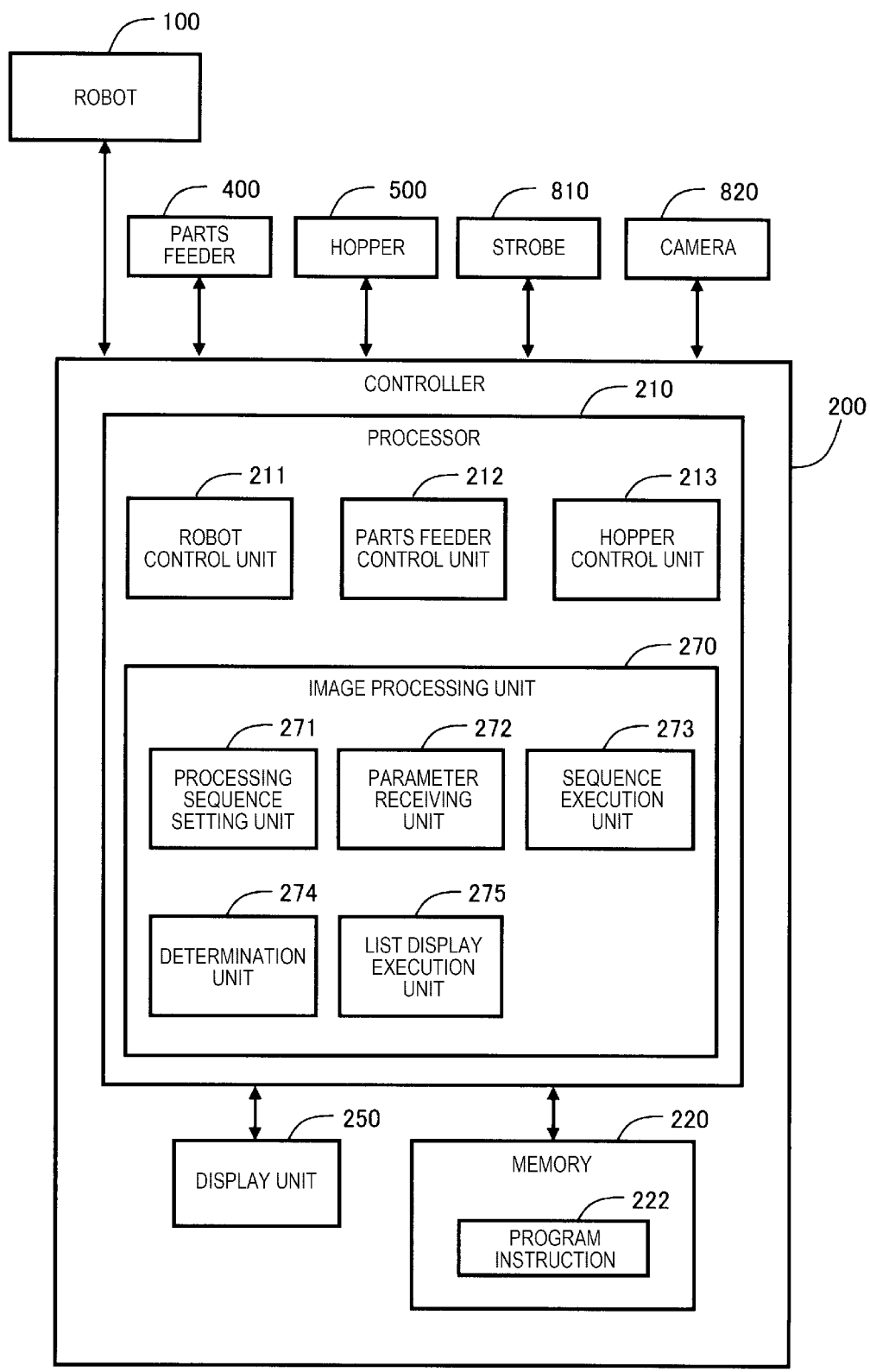
FIG. 4 is a block diagram showing functions of a controller.

FIG. 4 is a block diagram showing functions of the controller 200. The processor 210 of the controller 200 executes various program instructions 222 stored in advance in the main memory 220 to thereby realize various functions of the robot control unit 211, the parts feeder control unit 212, the hopper control unit 213, the image processing unit 270, respectively. The image processing unit 270 corresponds to an "image processing apparatus". In other words, the controller 200 includes the image processing unit 270 as the image processing apparatus, and is connected to the robot 100. Further, the display unit 250 connected to the image processing unit 270 may be included in the controller 200, or may be provided outside the controller 200 and connected by wired or wireless connection.

The image processing unit 270 includes a processing sequence setting unit 271 that sets a processing sequence including imaging with the camera 820 and processing the image, a parameter receiving unit 272 that receives parameters of the processing sequence, a sequence execution unit 273 that executes the processing sequence, a determination unit 274 that determines a result of executing the processing sequence (hereinafter referred to as 'processing result'), and a list display execution unit 275 that displays reduced images of the processing result in a list manner. The functions of these units will be described below.

Figure 5:
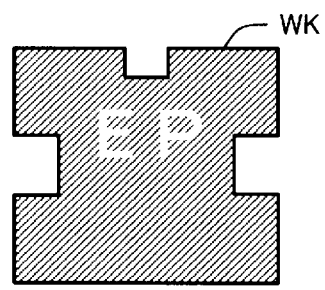
FIG. 5 is a plan view showing an example of a subject.

FIG. 5 is a plan view showing an example of a workpiece WK as a subject. This workpiece WK has a flat and dark surface. The workpiece WK is the part with white character "EP" marked on a surface thereof. When the robot 100 grips this workpiece WK, it is necessary to image the workpiece WK with the camera 820 and correctly measure and recognize the outline of the workpiece WK or a feature amount of the workpiece WK from the image.

Figure 6:
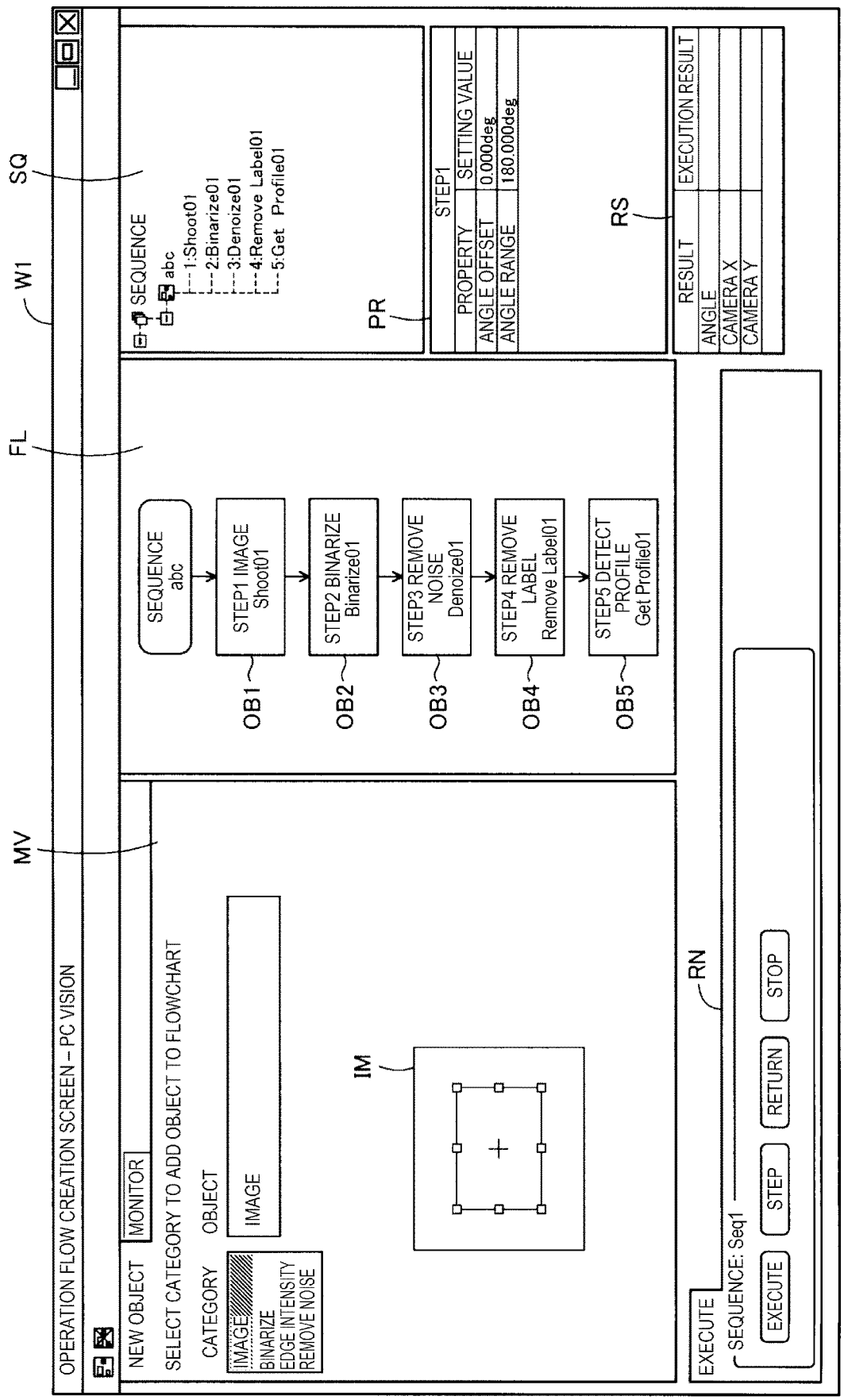
FIG. 6 is an explanatory diagram showing an example of an input screen used for creating a processing sequence.

FIG. 6 shows an example of a window W1 displayed on the display unit 250 by the processing sequence setting unit 271. This window W1 is an input screen for creating a processing sequence including imaging and image processing, and includes the following areas.

(1) Main View Area MV:

This area displays a plurality of categories indicating classifications of processing of a processing sequence, names of objects belonging to each category, descriptions of contents of the objects, and diagrams showing outlines of the objects. The objects displayed in the main view area MV may be optionally added to the processing sequence in a processing sequence creation area FL by an action such as drag-and-drop.

(2) Processing Sequence Creation Area FL:

This area displays a processing sequence in which one or more objects are arranged graphically in an editable manner.

(3) Sequence Display Area SQ:

This area displays a tree structure of the sequence displayed in the processing sequence creation area FL.

(4) Parameter Setting Area PR:

This area is for setting parameters relating to the entire processing sequence and processing parameters relating to individual processing. When one of blocks arranged in the processing sequence creation area FL is selected, the parameters for the selected block are displayed.

(5) Result Area RS:

This area displays the execution result of the processing sequence.

(6) Execution Instruction Area RN:

This area is for instructing the execution of the processing sequence.

In the example of FIG. 6, a state in which an instructor creates a processing sequence is displayed in the processing sequence creation area FL of the window W1. In this example, the following objects are arranged in order after the sequence block SB1.

(1) Imaging Object OB1

This is an object that specifies an operation of imaging the workpiece WK as a subject with the camera 820.

(2) Binarized Object OB2

This is an object that specifies processing of binarizing the image of the workpiece WK.

(3) Noise Removal Object OB3

This is an object that specifies processing of removing noise from the binarized image.

(4) Label Erase Object OB4

This is an object that specifies processing of erasing labels from the image after the noise removal. The "label" means a character or a mark indicated on the surface of the workpiece WK, and in the example of FIG. 5, the character "EP" corresponds to the label.

(5) Profile Detecting Object OB5

This is an object that specifies processing of detecting a profile showing the feature amount of the workpiece WK as the subject from various image processed. As the feature amount of the workpiece WK, for example, parameters of the profile detecting object OB5 may be set to detect a plurality of items such as a number of pixels of the workpiece WK, a center of gravity position, a luminance average value, a luminance variance value, and an edge intensity.

The name of the object is displayed in the block of each object OB1 to OB5. Any desired object may be added to the processing sequence from among the options of the objects displayed in the main view area MV. In addition, it is also possible to delete any undesired object in the processing sequence. It should be noted that the method of setting the processing sequence using the window W1 is merely an example, and the processing sequence may also be set by any method other than the above.

When any one of the blocks SB1, OB1 to OB5 arranged in the processing sequence creation area FL is selected, the parameters for the selected block are displayed in the parameter setting area PR. For example, when the sequence block SB1 is selected, parameters relating to the entire sequence are displayed. In addition, when anyone of the blocks OB1 to OB5 of the object is selected, the parameters relating to the object are displayed.

Figure 7:
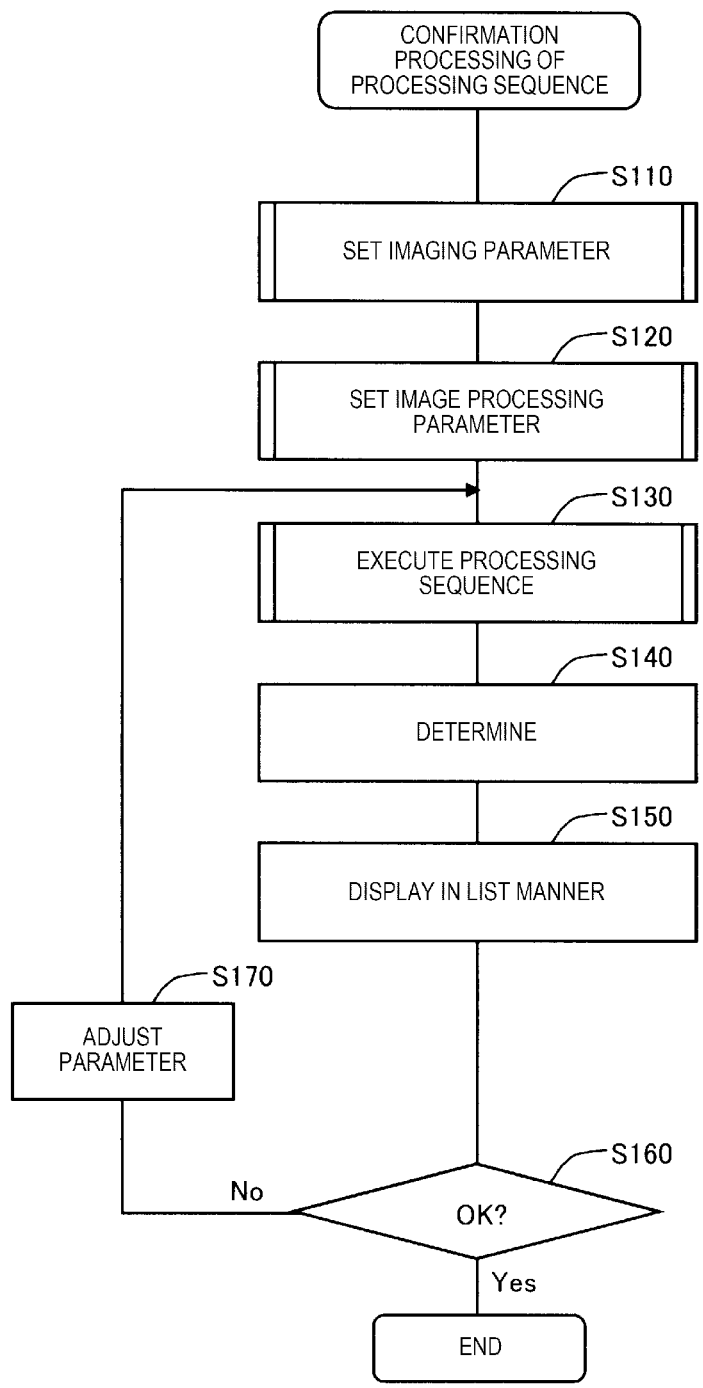
FIG. 7 is a flowchart showing a procedure of confirmation processing of a processing sequence.

FIG. 7 is a flowchart showing a procedure of confirmation processing of a processing sequence. This processing is executed by the processing sequence setting unit 271 and the parameter receiving unit 272.

In step S110, the imaging parameters are set. For example, when the instructor selects the first imaging object OB1 in the motion flow area FL of FIG. 6, the processing of step S110 is started.

Figure 8:
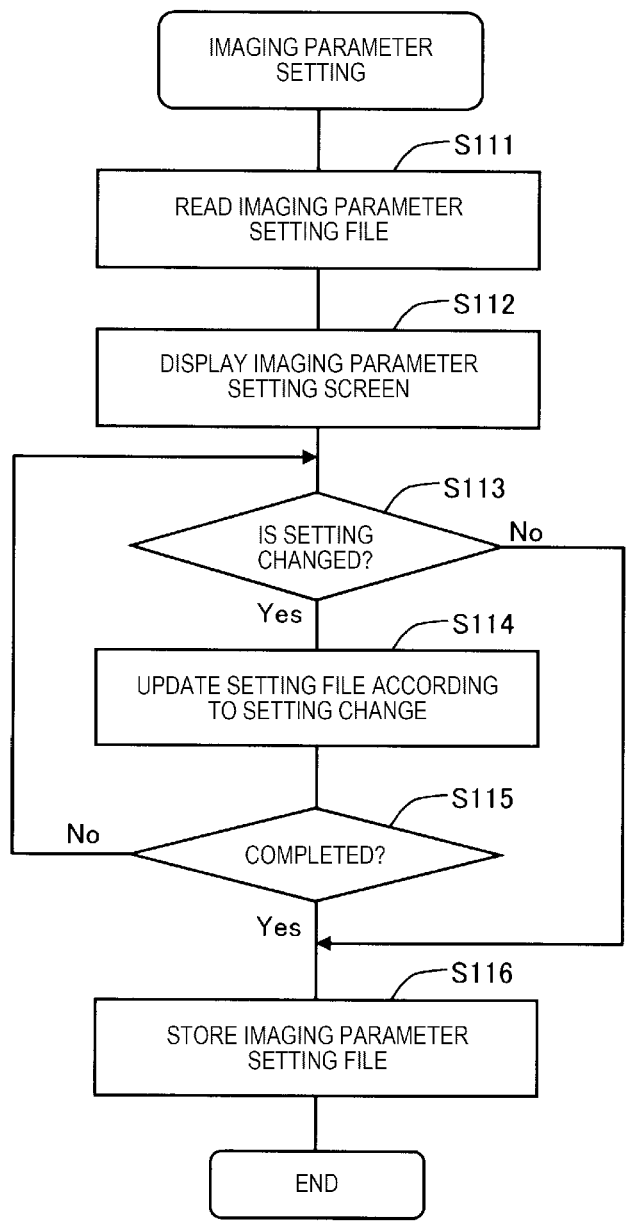
FIG. 8 is a flowchart showing a procedure of setting processing of an imaging parameter.

FIG. 8 is a flowchart showing a procedure of setting processing of an imaging parameter in step S110 of FIG. 7. This processing is executed by the parameter receiving unit 272. First, in step S111, the imaging parameter setting file is read. The imaging parameter setting file is set in advance and stored in the non-volatile memory 230. When the imaging is performed not even once for a certain subject, the imaging parameter setting file set with the initial value of the imaging parameter may be used. In step S112, an imaging parameter setting screen is displayed on the display unit 250.

Figure 9:
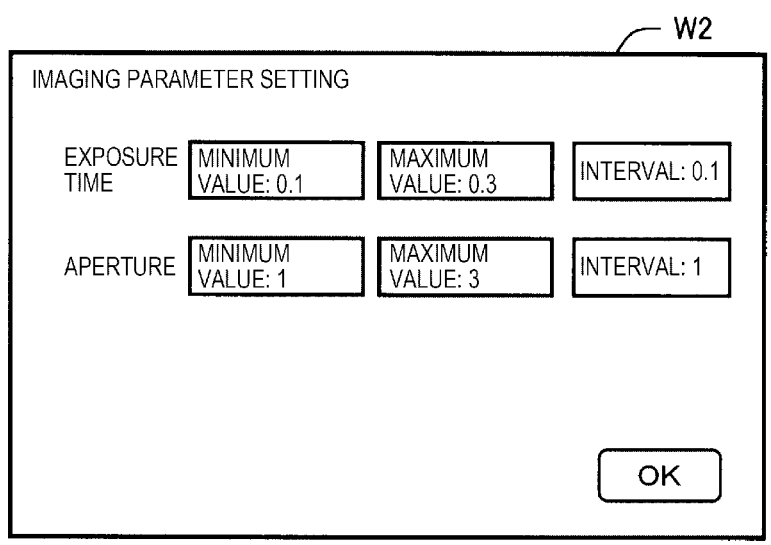
FIG. 9 is an explanatory diagram showing an example of a setting screen of an imaging parameter.

FIG. 9 is an explanatory diagram showing an example of the setting screen of an imaging parameter W2. In this example, two parameters of exposure time and aperture may be set as imaging parameters. For each parameter, a minimum value, a maximum value, and an interval may be set. In this example, the minimum value of the exposure time is 0.1 seconds, the maximum value is 0.3 seconds, and the interval is 0.1 seconds. This setting means that three values of 0.1 seconds, 0.2 seconds, and 0.3 seconds are set as the exposure time. In this example, three values are set for each of the exposure time and the aperture, and total nine combinations as the combinations of all are set as the imaging parameters. As for the imaging parameters, other parameters may be optionally set. For example, the imaging magnification, the light amount of the strobe 810, and the like may be set as the imaging parameters.

In step S113 of FIG. 8, it is determined whether or not the instructor changes the setting of the imaging parameters. When the imaging parameters are not changed, the processing proceeds to step S116 to be described below. On the other hand, when the imaging parameters are changed, and when the instructor changes the setting in step S114, the imaging parameter setting file is updated accordingly. When the setting change is not completed, the processing returns from step S115 to step S113. On the other hand, when the setting is completed, the processing proceeds to step S116, the imaging parameter setting file is stored, and the setting processing of the imaging parameter is completed.

In step S120 of FIG. 7, the image processing parameters are set. Step S120 may be automatically started as the step S110 is completed. Alternatively, the instructor may select the second object OB2 in the operation flow area FL of FIG. 6 so that the processing of step S120 is started.

Figure 10:
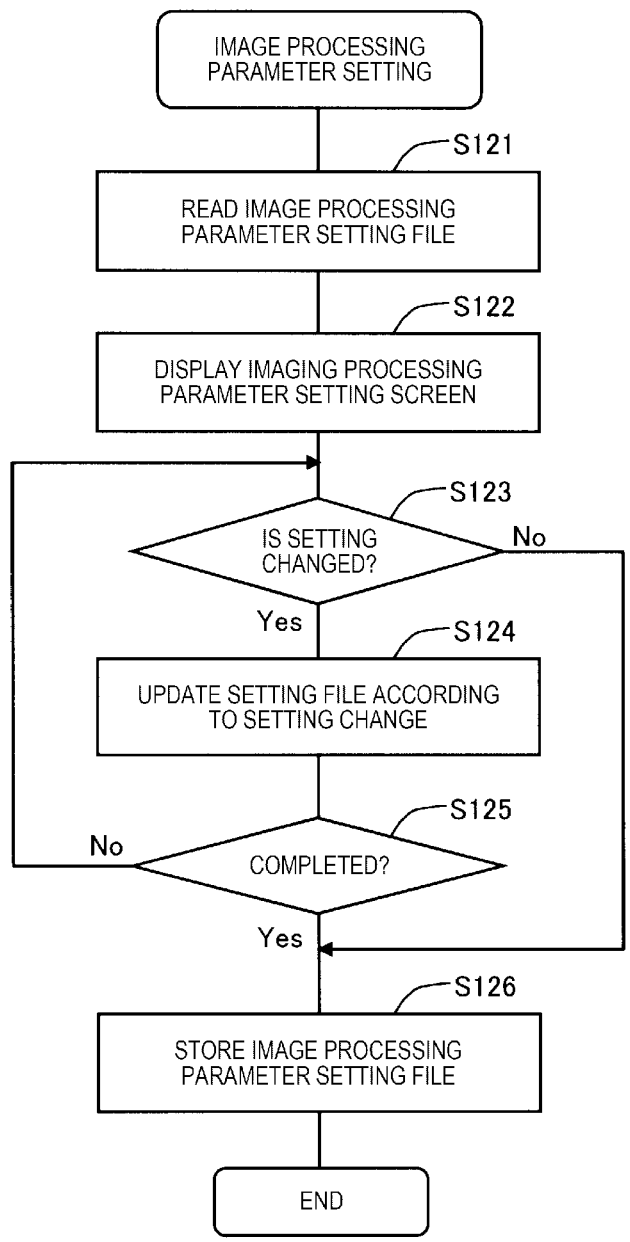
FIG. 10 is a flowchart showing a procedure of setting processing of an image processing parameter.

FIG. 10 is a flowchart showing a procedure of setting processing of an image processing parameter in step S120 of FIG. 7. This processing is also executed by the parameter receiving unit 272. The processing in steps S121 to S126 in FIG. 10 is obtained by replacing "imaging parameters" insteps S111 to S116 in FIG. 8 with "image processing parameters", so a detailed explanation will not be repeated.

Figure 11:
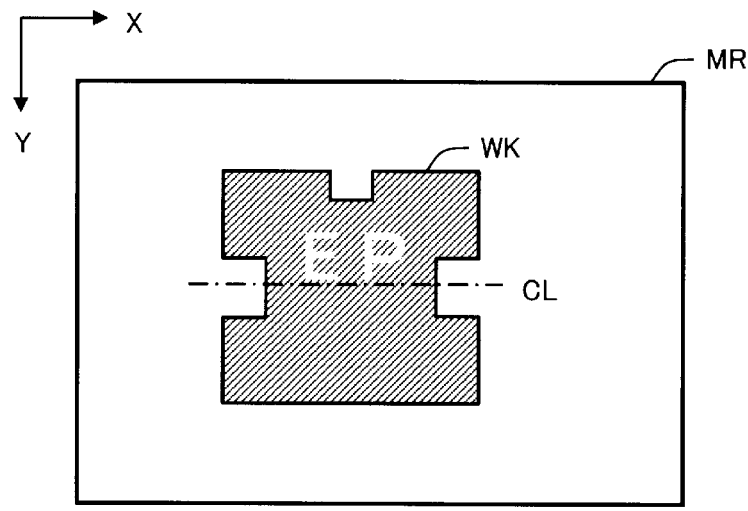
FIG. 11 is an explanatory diagram showing an example of an image of an imaged subject.

FIG. 11 shows an example of the image MR obtained by imaging the workpiece WK with the camera 820. Hereinafter, an example of a setting of image processing parameters will be described with this image MR as an example.

Figure 12:
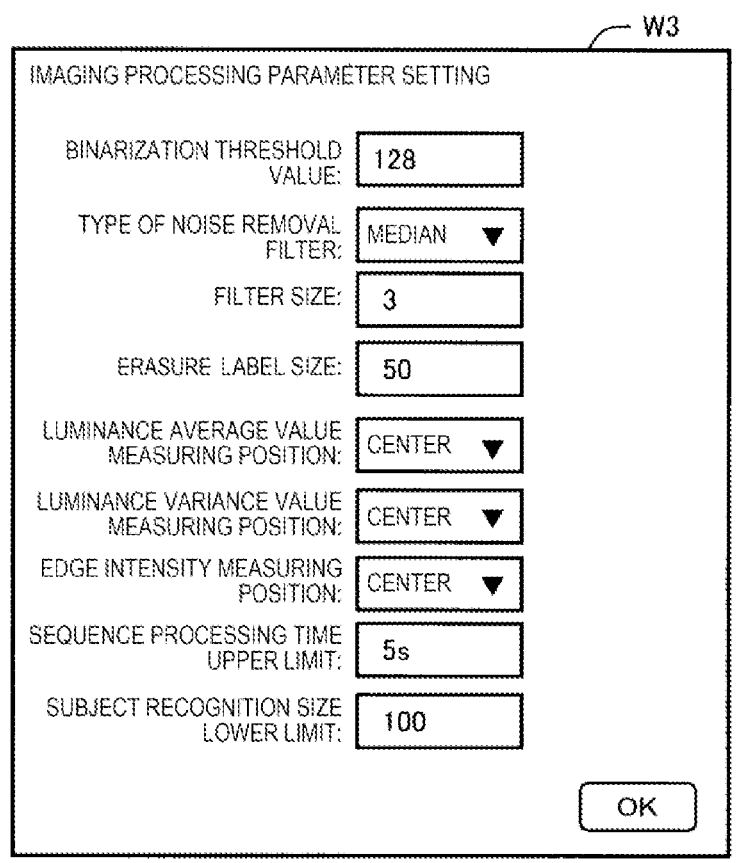
FIG. 12 is an explanatory diagram showing an example of a setting screen of an image processing parameter.

FIG. 12 is an explanatory diagram showing an example of the setting screen of an image processing parameter W3. In this example, the following image processing parameters may be set.

(1) Binarization Threshold Value

This is a threshold value used in binarization processing of the binarized object OB2.

(2) Type of Noise Removal Filter

This is a type of a filter used in the noise removal processing of the noise removal object OB3. As the noise removal filter, a median filter or a smoothing filter may be selected, for example.

(3) Filter Size

This is a size of a filter used in the noise removal processing of the noise removal object OB3 and indicates the number of pixels on one side of the filter.

(4) Erasure Label Size

This indicates a number of pixels of characters to be erased in the label erasure object OB4. For example, as shown in FIG. 11, when there are two characters "E" and "P" on the surface of the workpiece WK, when the number of pixels of each of the characters "E" and "P" is equal to or less than the erasure label size, the characters are erased.

(5) Luminance Average Value Measuring Position

This is a value indicating at which position of the subject the luminance average value of the subject is calculated as the profile to be detected in the profile detecting object OB5. Here, "center" is selected as the luminance average value measuring position. At this time, as shown in FIG. 11, the luminance average value of the workpiece WK is calculated on a center line CL of the workpiece WK as the subject in the Y direction. The center line CL is a straight line passing through the center of gravity of the workpiece WK and is parallel to a lateral direction of the image MR. It should be noted that the center in the X direction may be selected instead of the center in the Y direction of the workpiece WK. In addition, as a luminance average value measuring position, a position other than the center may be optionally set. Specifically, for example, the position may be set at a position 1 cm from the upper end of the workpiece WK.

(6) Luminance Variance Value Measuring Position

This is a value indicating at which position of the subject the luminance variance value of the subject is calculated as the profile to be detected in the profile detecting object OB5.

(7) Edge Intensity Measuring Position

This is a value indicating at which position of the subject the edge intensity of the subject is calculated as the profile to be detected in the profile detecting object OB5. In the example of FIG. 12, since the "center" is selected, the edge intensity is calculated for each pixel on the center line CL of the workpiece WK shown in FIG. 10.

(8) Sequence processing time upper limit

This is an allowable time for image processing excluding imaging. When the execution time of the image processing sequence exceeds this upper limit, since the processing takes a long time, the processing sequence is rejected.

(9) Subject Recognition Size Lower Limit

This is a lower limit of the number of pixels of the subject recognized in the image. When the number of pixels of the subject is less than this lower limit value, since the subject may not be correctly recognized, the processing sequence is rejected.

The parameters (1) to (4) above are parameters that influence the determination of whether the result of image processing is acceptable or not, and correspond to "image processing parameters" in a narrow sense. Regarding these image processing parameters, like the imaging parameters shown in FIG. 9, a plurality of values may be set for one parameter. In this case, for each of a plurality of combinations of the imaging parameters and the image processing parameters, a processing sequence is executed to determine whether the processing result is acceptable or not.

The three parameters (5) to (7) above correspond to the items of the profile indicating the attribute of the subject. Items other than these may also be used as items of the profile.

The two parameters (8) and (9) above are used as a determination condition for determining whether the processing result of image processing is acceptable or not. When these two parameters are used as a determination condition, and when both of these are satisfied, it is determined that the determination condition is satisfied. However, these are only examples, and the determination condition of the processing result may be optionally set according to the type of the subject and image processing.

When all the imaging parameters and the image processing parameters are set in this manner, the processing sequence is executed in step S130 of FIG. 7. For example, when the instructor presses the "execute" button included in the execution instruction area RN of FIG. 6, step S130 is started.

Figure 13:
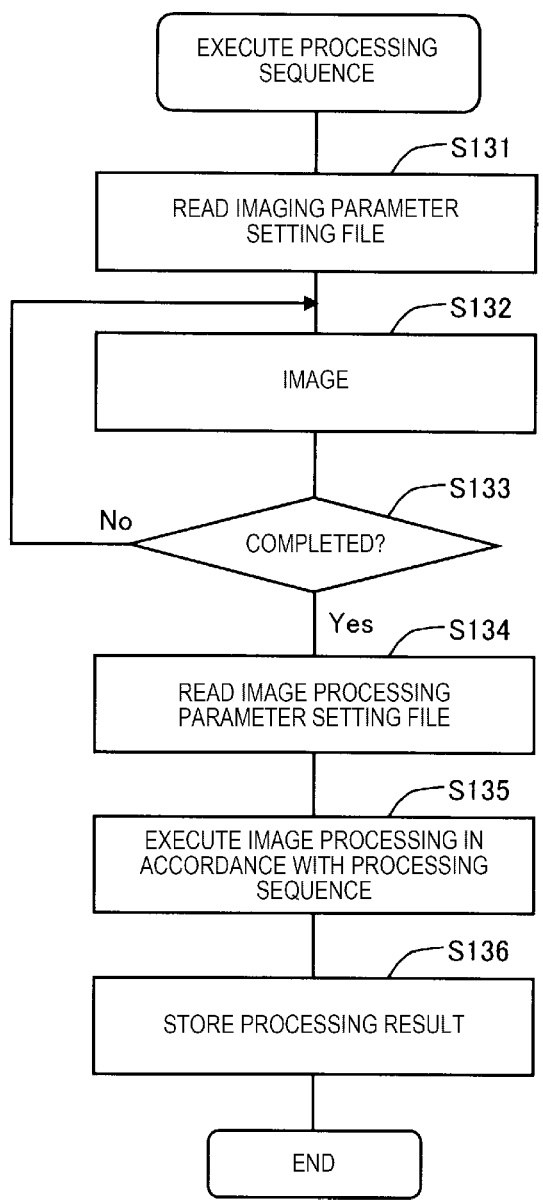
FIG. 13 is a flowchart showing an execution procedure of a processing sequence.

FIG. 13 is a flowchart showing an execution procedure of the processing sequence in step S130 of FIG. 7. This processing is executed by the sequence execution unit 273.

In step S131, the imaging parameter setting file is read, and in step S132, imaging of the subject with the camera 820 is executed according to the imaging parameters. For imaging, light emission from the strobe 810 may also be used as desired. As described with reference to FIG. 9, since nine combinations of imaging parameters are set as the imaging conditions, imaging is executed under these nine kinds of imaging conditions, creating nine images. In step S133, it is determined whether or not all imaging is completed, and when it is not completed, the processing returns to step S132. On the other hand, when all the imaging is completed, the processing proceeds to step S134.

In step S134, the image processing parameter setting file is read, and in step S135, image processing is executed in accordance with the processing sequence for each of the plurality of images. In step S136, the processing result is stored.

When the processing sequence is completed in this manner, the processing proceeds to step S140 of FIG. 7, and the determination on the processing result is executed by the determination unit 274. The determination of the processing result is performed for a plurality of items including "sequence processing time" and "subject size" described in FIG. 12. Then, in step S150, a list display for indicating the processing result is executed by the list display execution unit 275.

Figure 14:
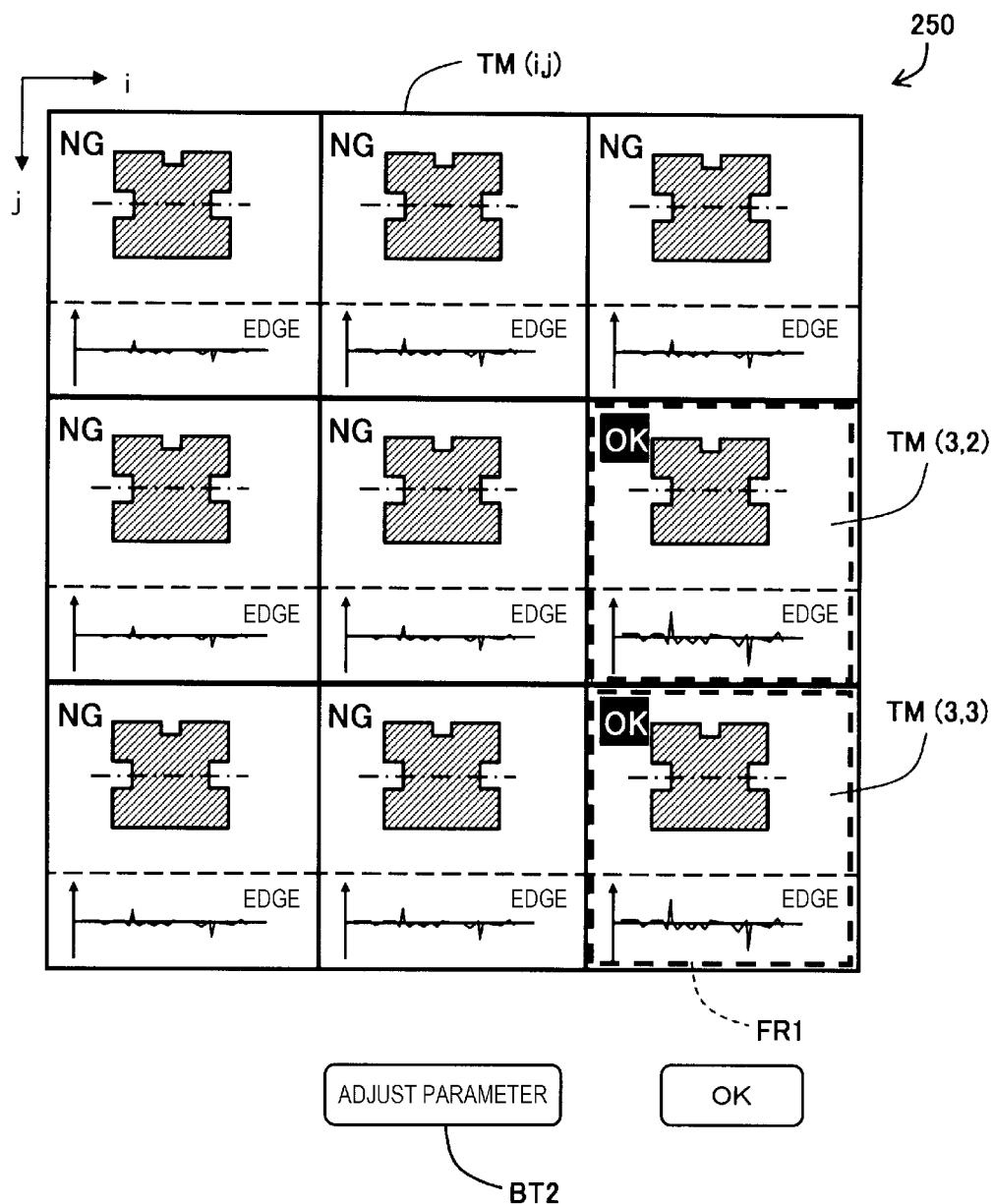
FIG. 14 is an explanatory diagram showing an example of a list display of processing results.

FIG. 14 is an explanatory diagram showing an example of a list display of the processing results. Here, a plurality of result images TM (i, j) corresponding to a plurality of imaging conditions set in the imaging parameter setting profile are displayed in a list manner on the display unit 250. As described with reference to FIG. 9, since three values are set for each of the exposure time and the aperture in the present embodiment, nine result images TM (i, j) corresponding to these nine combinations are displayed in a list manner. In FIG. 14, the horizontal axis i corresponds to three values of the exposure time, and the vertical axis j corresponds to three values of the aperture, for example. In order to display a plurality of result images TM (i, j) in a list manner on the display unit 250, each result image TM (i, j) includes a reduced image of the image after image processing. As the reduced image, a thumbnail image is used, for example.

In the display area of the result image TM (i, j), a code "OK" or "NG" indicating whether or not the processing result satisfies the determination condition is displayed. That is, when the processing result satisfies the determination condition, characters "OK" are displayed, and when it does not satisfy, characters "NG" are displayed. These two codes may be displayed in such a manner that the instructor may easily identify them. For example, the characters "OK" may be displayed in green, and the characters "NG" may be displayed in red. In this way, it is possible for the instructor to easily find a set of parameters that lead to an acceptable processing result.

Further, a frame line FR1 is drawn to surround the result image in order to emphasize that the image TM (i, j) is acceptable, when the processing result of the result image TM (i, j) satisfies the determination condition. The frame line FR1 may also be displayed in a manner that allows the instructor to easily identify the same. For example, the frame line FR1 may be displayed to surround the result image and slightly outside a periphery of the result image, or may be displayed to overlap the periphery of the result image, or the frame line FR1 may be displayed slightly inside the periphery of the result image. Further, the frame line FR1 may be displayed in green. In this way, when the determination condition is satisfied, and when the specific frame line FR1 is displayed in the result image TM (i, j), there is an advantage in that the instructor may easily determine which parameter setting is acceptable. The frame line FR1 may be omitted.

A distribution of edge intensities is displayed at a position adjacent to the reduced image of the result image TM (i, j). The distribution of the edge intensities is the distribution at the edge intensity measuring position that is set in FIG. 12. In addition to the edge intensity, or in place of the edge intensity, the luminance average value and the luminance variance value may be displayed around the reduced image. When such profile of the subject is displayed in the display area of the result image TM (i, j), the instructor may determine whether the result image TM (i, j) is acceptable or not more accurately. However, display of the profile of the subject may not be drawn.

In each result image TM (i, j), it is preferable that a portion other than the reduced image may be drawn after the reduced image is created. In this way, since the line width of the frame line FR1 or the code "OK" or "NG" indicating the pass/fail determination result is prevented from being narrowed, display may be provided for the instructor to identify more easily.

In the example of FIG. 14, the processing results of the two result images TM (3, 2), TM (3, 3) are acceptable. The instructor may adopt the parameters corresponding to any of the result images TM (3, 2) and TM (3, 3) as parameters of the processing sequence.

In step S160 of FIG. 7, it is determined whether or not the adjustment of the processing sequence is completed, and when not completed, the parameter is adjusted in step S170. The adjustment of the parameter is started by pressing the button BT2 in FIG. 14, for example.

Figure 15:
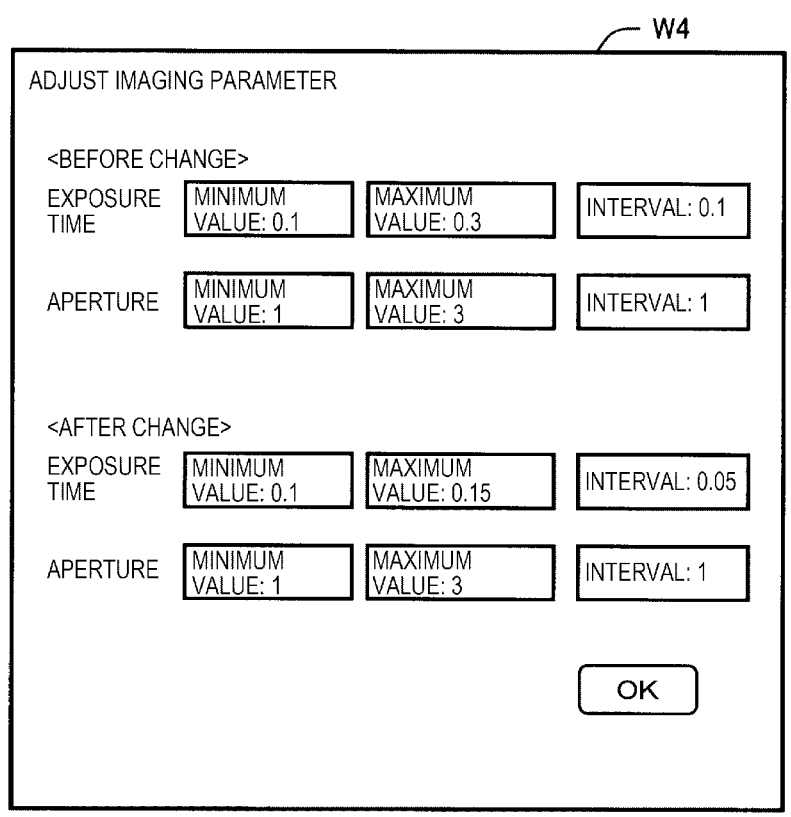
FIG. 15 is an explanatory diagram showing an example of an adjustment screen of an imaging parameter.

FIG. 15 is an explanatory diagram showing an example of an adjustment screen of an imaging parameter W4. Here, the imaging parameters before and after the change are displayed. The changed imaging parameters may be optionally entered. However, the interval of the changed parameters may be set to a finer value than before the change. In this way, since parameters may be examined at finer intervals, acceptable parameters may be obtained. For this purpose, the interval of the initial parameters may be set to a value greater than the minimum value. The image processing parameters may also be adjusted as needed.

When the parameters are adjusted in step S170, the processing returns to step S130, and the steps S130 to S160 described above are executed again. Thus, it is possible to obtain appropriate parameters by repeatedly executing the processing sequence while adjusting the parameters.

As described above, in the first embodiment, since a list display of the processing results for a plurality of sets of parameter settings is provided in each display area of the plurality of result images TM (i, j), allowing identification of whether or not the processing result satisfying the determination condition, it is possible to easily determine whether or not the parameter setting of each set is acceptable. In particular, in the first embodiment, as a code indicating the processing result, characters directly expressing the acceptable quality of the result are used, thus providing an advantage that the instructor may easily understand whether the parameter setting is acceptable or not.

B. Other Embodiments

Figure 16:
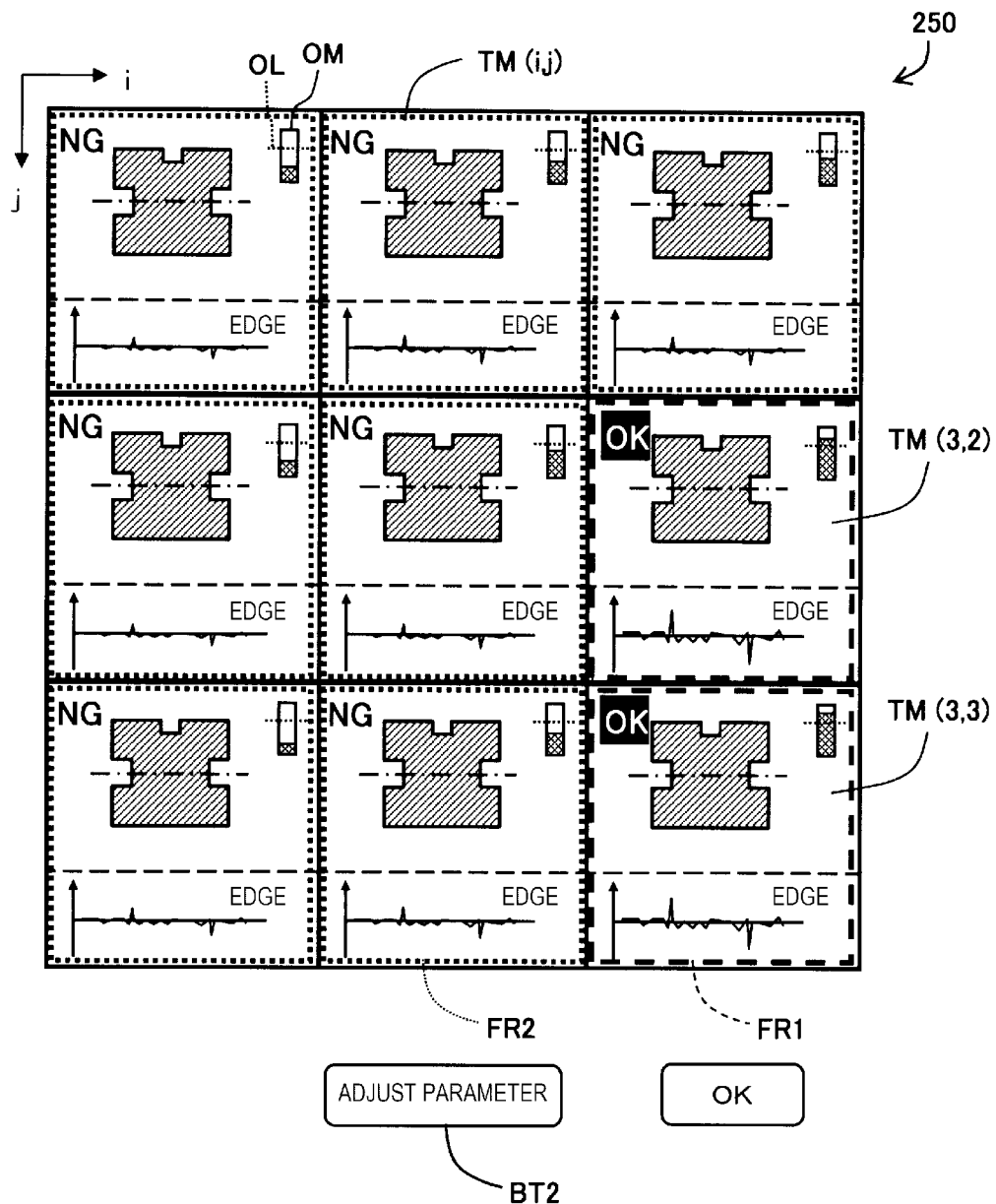
FIG. 16 is an explanatory diagram showing another example of a list display of processing results.

FIG. 16 is an explanatory diagram showing another example of the list display of processing results. In this example, in addition to the list display described with reference to FIG. 14, two displays are provided, that is, a second frame line FR2 drawn to indicate when the processing result does not satisfy the determination condition, and a determination condition achievement degree OM.

The second frame line FR2 is drawn on the result image TM (i, j) of which the processing result does not satisfy the determination condition. In addition, the second frame line FR2 may be displayed in such a manner that the processing result may be distinguished from the first frame line FR1 drawn on the result image TM (i, j) that satisfies the determination condition. For example, the first frame line FR1 and the second frame line FR2 may be displayed in different colors. Specifically, the first frame line FR1 may be displayed in green and the second frame line FR2 may be displayed in red, for example. In this way, there is an advantage that it is possible to more easily determine parameter setting that is acceptable.

The determination condition achievement degree OM is information indicating the extent that the processing result satisfies the determination condition. In this example, with respect to the determination condition achievement degree OM, the value of the determination item is depicted as a bar graph, and a line indicating a threshold value OL is also drawn. When the number of pixels of the subject is used as a determination condition, the value of the "subject recognition size lower limit" described in FIG. 12 is displayed as the threshold value OL and the number of pixels of the subject recognized by the image processing is displayed in a bar graph. As shown in FIG. 16, the determination condition achievement degree OM indicates the extent that the processing result satisfies the determination condition, including the case where the value of the processing result is smaller than the threshold value OL, and the case where the value of the processing result is greater than the threshold value OL. In this manner, when information indicating the extent that the determination condition is satisfied is visibly displayed in each display area of the plurality of result images TM (i, j), there is an advantage that it is easy to determine how acceptable the parameter setting of each set is.

Figure 17:
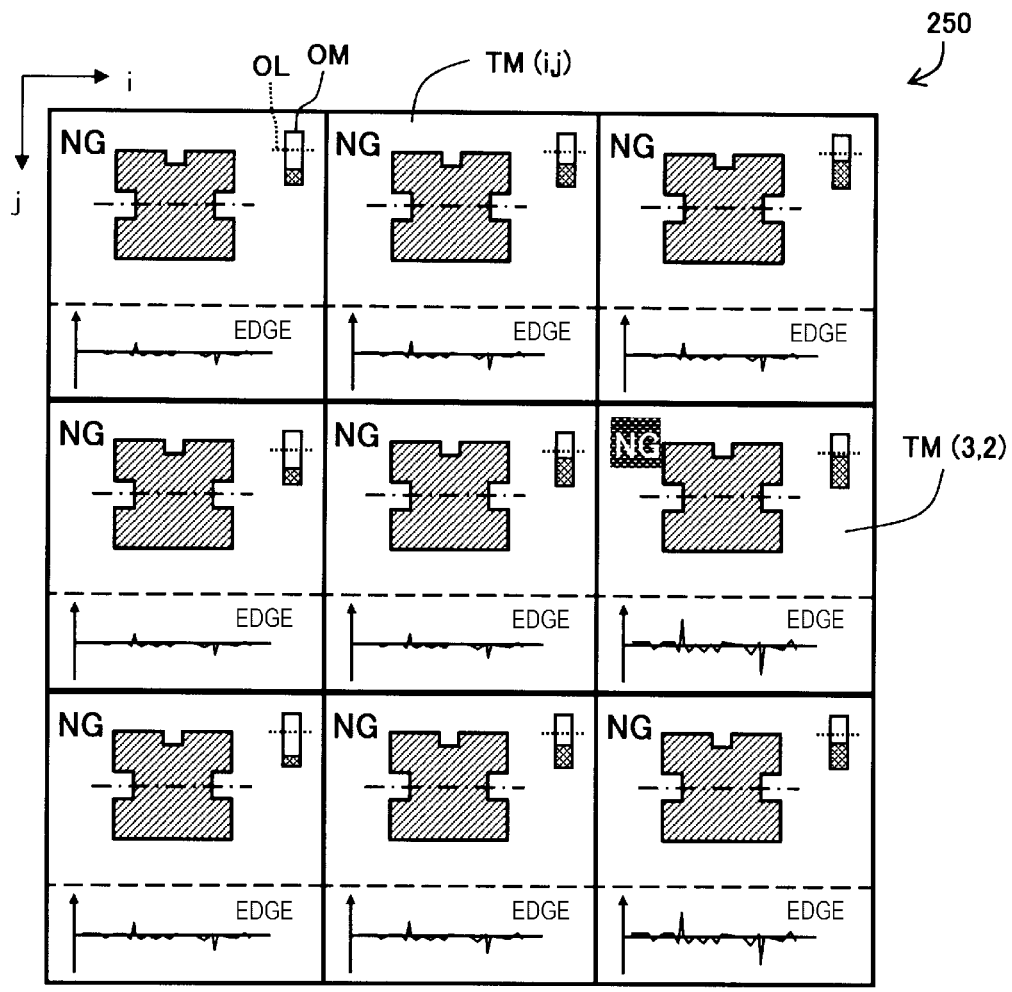
FIG. 17 is an explanatory diagram showing still another example of a list display of processing results.

FIG. 17 is an explanatory diagram showing another example of the list display of processing results. In this example, none of the result images TM (i, j) satisfy the determination condition, and "NG" characters are displayed. Meanwhile, referring to the graph of the determination condition achievement degree OM, it can be appreciated that the result image TM (3, 2) has the highest determination condition achievement degree OM. As a result, the characters "NG" indicating failure are displayed in the result image TM (3, 2) in a manner distinguishable from the characters "NG" in the other result images TM (i, j). Specifically, for example, the characters "NG" in the result image TM (3, 2) are displayed in a color different from the characters "NG" in the other result images. In this way, when none of the plurality of sets of parameter settings satisfy the determination condition, the result image having the highest degree of satisfaction of the determination condition may be displayed with such a fact displayed visibly in the display area, which may allow one to predict changes to the ranges of the parameter setting that could lead to inclusion of the result image satisfying the determination condition, and accordingly, there is an advantage that the parameter setting that satisfies the determination condition may be easily adjusted.

The present disclosure is not limited to the embodiment described above, and may be realized in various aspects without departing from the gist thereof. For example, the present disclosure may be realized by the following aspect. Technical features in the above aspects corresponding to technical features in each of the aspects described below may be replaced or combined as appropriate in order to solve some or all of the problems of the present disclosure or in order to achieve some or all of the effects of the present disclosure. In addition, unless its technical features are described as essential in this specification, it may be deleted as appropriate.

(1) According to a first aspect of the present disclosure, there is provided an image processing apparatus connected to a display unit. The image processing apparatus includes a parameter receiving unit that receives a plurality of sets of parameter settings including a combination of imaging parameters for imaging a subject and acquiring an image and image processing parameters for performing image processing on the image; a sequence execution unit that executes a processing sequence including the imaging and the image processing based on the plurality of sets of parameter settings to output a result image; a determination unit that determines whether a feature amount included in the result image is acceptable or not based on a predetermined determination condition, and a list display execution unit that causes the display unit to display each of a plurality of reduced images indicating execution results of the processing sequence of the plurality of sets of parameter settings as a plurality of result images in a list manner. The list display execution unit displays a determination result by the determination unit on each display area of the plurality of result images. According to this image processing apparatus, as the list display of the processing results of a plurality of sets of parameter settings, whether or not the result of the processing sequence satisfies the determination condition is distinguishably displayed in each display area of the plurality of result images, so it is possible to easily determine whether or not the parameter setting of each set including the imaging parameters and the image processing parameters is acceptable.

(2) In the image processing apparatus, the list display execution unit may display a degree of satisfaction of the determination condition in each display area of the plurality of result images. According to this image processing apparatus, the degree of satisfaction of the determination condition is displayed in each display area of the plurality of result images, so it is possible to easily determine to what extent the parameter setting of each set is acceptable.

(3) In the image processing apparatus, when none of the plurality of sets of parameter settings satisfy the determination condition, the list display execution unit may display, in a display area of a result image having a highest degree of satisfaction of the determination condition, information indicating that the degree of satisfaction of the determination condition is highest. According to this image processing apparatus, when none of the plurality of sets of parameter settings satisfy the determination condition, since the display area of the result image having the highest degree of satisfaction of the determination condition visibly displays that it has the highest degree of satisfaction of the determination condition, it is possible to predict which changes to the ranges of the parameter setting can lead to inclusion of a result image satisfying the determination condition, and easily adjust the parameter setting so that the determination condition is satisfied.

(4) In the image processing apparatus, the list display execution unit may display a first frame line surrounding a result image satisfying the determination result, when the determination condition is satisfied. According to this image processing apparatus, the first frame line is displayed on the result image when the determination condition is satisfied, so it is possible to easily determine which parameter setting is acceptable.

(5) In the image processing apparatus, the list display execution unit may display a second frame line on the result image when the determination condition is not satisfied, and the first frame line and the second frame line may be displayed in different colors. According to this image processing apparatus, frame lines are displayed on the result image in different colors between when the determination condition is satisfied and when the determination condition is not satisfied, so it is possible to easily determine which parameter setting is acceptable.

(6) In the image processing apparatus, the determination condition may include a condition that a processing time of the processing sequence is equal to or shorter than a preset allowable time. According to this image processing apparatus, the determination condition including the condition that the processing time of the processing sequence is equal to or shorter than the preset allowable time is used, so it is possible to easily determine whether or not the parameter setting requires excessive processing time.

(7) According to a second aspect of the present disclosure, there is provided an image processing apparatus connected to a display unit. The image processing apparatus includes a processor, in which the processor (a) receives a plurality of sets of parameter settings including a combination of imaging parameters for imaging a subject and acquiring an image and image processing parameters for performing image processing on the image, (b) executes a processing sequence including the imaging and the image processing based on the plurality of sets of parameter settings to output a result image, (c) determines whether a feature amount included in the result image is acceptable or not based on a predetermined determination condition, and (d) causes the display unit to display each of a plurality of reduced images indicating an execution result of the processing sequence of the plurality of sets of parameter settings as a plurality of result images in a list manner. The processor displays the determination result based on the pass/fail determination in each display area of the plurality of result images. According to this image processing apparatus, as the list display of the processing results of a plurality of sets of parameter settings, whether or not the result of the processing sequence satisfies the determination condition is displayed in each display area of the plurality of result images, so it is possible to easily determine whether or not the parameter setting of each set including the imaging parameter and the image processing parameter is acceptable.

(8) According to a third aspect of the present disclosure, there is provided a robot connected to a controller including an image processing apparatus. According to this robot, when the processing sequence is executed with respect to a workpiece as a subject, it is possible to easily determine whether or not the parameter setting of each set is acceptable, so it is possible to set the parameters of imaging and image processing of workpiece to a preferable setting.

(9) According to a fourth aspect of the present disclosure, there is provided a robot system including a robot, and a controller including the image processing apparatus connected to the robot. According to this robot system, when the processing sequence is executed with respect to a workpiece as a subject, it is possible to easily determine whether or not the parameter setting of each set is acceptable, so it is possible to set the parameters of imaging and image processing of workpiece to a preferable setting.

The present disclosure may be realized in various aspects other than the above. For example, the present disclosure may be realized in the form of a computer program for realizing the image processing method and the function of the image processing apparatus, and a non-transitory storage medium for recording the computer program, and the like.

What is claimed is:

1. An image processing apparatus comprising:
a processor configured to execute a program so as to:
receive parameter settings including a combination of imaging parameters stored in a memory and image processing parameters stored in the memory, the imaging parameters relating to an exposure time and an aperture of imaging, the image processing parameters corresponding to a binarization threshold value, a noise removal filter, a filter size, an erasure character size, a first measuring position of a luminance average value, a second measuring position of a luminance variance value, a third measuring position of an edge intensity, an upper limit of a sequence processing time, and a lower limit of a subject recognition size;
execute a processing sequence including the imaging and image processing based on the parameter settings to output a result image including a plurality of result sub-images;
determine whether each of the plurality of result sub-images of the result image satisfies a predetermined determination condition of the sequence processing time and the subject recognition size; and
display the determined plurality of result sub-images on a display, each of the determined plurality of result sub-images having information indicating a result of the determination.

2. The image processing apparatus according to claim 1, wherein
the processor is configured to display a degree of satisfaction of the predetermined determination condition in a display area of each of the plurality of result bub-images.

3. The image processing apparatus according to claim 2, wherein,
when none of the parameter settings satisfies the predetermined determination condition, the processor is configured to display, in the display area of one result sub-image of the plurality of result sub-images having a highest degree of satisfaction of the predetermined determination condition, information indicating that the degree of satisfaction of the predetermined determination condition is highest.

4. The image processing apparatus according to claim 1, wherein,
when the predetermined determination condition is satisfied, the processor is configured to display a first frame line surrounding a corresponding result sub-image of the plurality of result sub-images satisfying the predetermined determination condition.

5. The image processing apparatus according to claim 4, wherein,
when the predetermined determination condition is not satisfied, the processor is configured to display a second frame line on a corresponding result sub-image of the plurality of result sub-images that does not satisfy the predetermined determination condition, and the first frame line and the second frame line are in different colors.

6. The image processing apparatus according to claim 1, wherein
the predetermined determination condition includes a condition that a processing time of the processing sequence is equal to or shorter than a preset allowable time.

7. A robot controlled based on a determination result of an image processing apparatus, the image processing apparatus comprising:
a processor configured to execute a program so as to:
receive parameter settings including a combination of imaging parameters stored in a memory and image processing parameters stored in the memory, the imaging parameters relating to an exposure time and an aperture of imaging, the image processing parameters corresponding to a binarization threshold value, a noise removal filter, a filter size, an erasure character size, a first measuring position of a luminance average value, a second measuring position of a luminance variance value, a third measuring position of an edge intensity, an upper limit of a sequence processing time, and a lower limit of a subject recognition size;
execute a processing sequence including the imaging and image processing based on the parameter settings to output a result image including a plurality of result sub-images;
determine whether each of the plurality of result sub-images of the result image satisfies a predetermined determination condition of the sequence processing time and the subject recognition size; and
display the determined plurality of result sub-images on a display, each of the determined plurality of result sub-images having information indicating a result of the determination.

8. The robot according to claim 7, wherein
the processor is configured to display a degree of satisfaction of the predetermined determination condition in a display area of each of the plurality of result sub-images.

9. The robot according to claim 8, wherein,
when none of the parameter settings satisfies the predetermined determination condition, the processor is configured to display, in the display area of one result sub-image of the plurality of result sub-images having a highest degree of satisfaction of the predetermined determination condition, information indicating that the degree of satisfaction of the predetermined determination condition is highest.

10. The robot according to claim 8, wherein,
when the predetermined determination condition is satisfied, the processor is configured to display a first frame line surrounding a corresponding result sub-image of the plurality of result sub-images satisfying the predetermined determination condition.

11. The robot according to claim 10, wherein,
when the predetermined determination condition is not satisfied, the processor is configured to display a second frame line on a corresponding result sub-image of the plurality of result sub-images that does not satisfy the predetermined determination condition, and the first frame line and the second frame line are in different colors.

12. The robot according to claim 8, wherein
the predetermined determination condition includes a condition that a processing time of the processing sequence is equal to or shorter than a preset allowable time.

13. A robot system comprising:
a robot;
a display configured to display a determination result image;

a memory configured to store a program, imaging parameters, and image processing parameters, the imaging parameters being used for imaging a subject and acquiring an image, the image processing parameters being used for performing image processing on the image; and an image processing apparatus connected to the display, the imaging processing apparatus including a processor, the processor being configured to execute the program so as to:

receive parameter settings including a combination of the imaging parameters and the image processing parameters, the imaging parameters relating to an exposure time and an aperture of the imaging, the image processing parameters corresponding to a binarization threshold value, a noise removal filter, a filter size, an erasure character size, a first measuring position of a luminance average value, a second measuring position of a luminance variance value, a third measuring position of an edge intensity, an upper limit of a sequence processing time, and a lower limit of a subject recognition size;

execute a processing sequence including the imaging and the image processing based on the parameter settings to output a result image including a plurality of result sub-images;

determine whether each of the plurality of result sub-images of the result image satisfies a predetermined determination condition, condition of the sequence processing time and the subject recognition size; and display the determined plurality of result sub-images on the display, each of the determined plurality of result sub-images having information indicating a result of the determination.

14. The robot system according to claim 13, wherein the processor is configured to display a degree of satisfaction of the predetermined determination condition in a display area of each of the plurality of result sub-images.

15. The robot system according to claim 14, wherein, when none of the parameter settings satisfies the predetermined determination condition, the processor is configured to display, in the display area of one result sub-image of the plurality of result sub-images having a highest degree of satisfaction of the predetermined determination condition, information indicating that the degree of satisfaction of the predetermined determination condition is highest.

16. The robot system according to claim 13, wherein, when the predetermined determination condition is satisfied, the processor is configured to display a first frame line surrounding a corresponding result sub-image of the plurality of result sub-images satisfying the predetermined determination condition.

17. The robot system according to claim 16, wherein, when the predetermined determination condition is not satisfied, the processor is configured to display a second frame line on a corresponding result sub-image of the plurality of result sub-images that does not satisfy the predetermined determination condition, and the first frame line and the second frame line are in different colors.

18. The robot system according to claim 13, wherein, the predetermined determination condition includes a condition that a processing time of the processing sequence is equal to or shorter than a preset allowable time.

* * * * *